US012350631B2

(12) United States Patent
Jones

(10) Patent No.: US 12,350,631 B2
(45) **Date of Patent: *Jul. 8, 2025**

(54) BAFFLED DONUT APPARATUS FOR USE IN SYSTEM AND METHOD FOR FORMING GYPSUM BOARD

(71) Applicant: CERTAINTEED GYPSUM OPERATING COMPANY, LLC, Herndon, VA (US)

(72) Inventor: Roger Jones, Palatka, FL (US)

(73) Assignee: CERTAINTEED GYPSUM OPERATING COMPANY, LLC, Herndon, VA (US)

( * ) Notice: Subject to any disclaimer, the term of this patent is extended or adjusted under 35 U.S.C. 154(b) by 462 days.

This patent is subject to a terminal disclaimer.

(21) Appl. No.: 17/830,922

(22) Filed: Jun. 2, 2022

(65) Prior Publication Data

US 2022/0288545 A1 Sep. 15, 2022

Related U.S. Application Data

(63) Continuation of application No. 16/796,348, filed on Feb. 20, 2020, now Pat. No. 11,376,555, which is a (Continued)

(51) Int. Cl.
*B01F 25/421* (2022.01)
*B01F 23/235* (2022.01)
(Continued)

(52) U.S. Cl.
CPC ........ *B01F 25/4231* (2022.01); *B01F 23/235* (2022.01); *B01F 25/4316* (2022.01); *B01F 25/4334* (2022.01); *B01F 25/4335* (2022.01); *B01F 35/531* (2022.01); *B05C 9/10* (2013.01); *B05C 11/00* (2013.01); *B05D 3/002* (2013.01); *B05D 3/12* (2013.01); *B28B 19/0092* (2013.01); *B28C 5/02* (2013.01); *B28C 5/381* (2013.01); *B01F 23/291* (2022.01); (Continued)

(58) Field of Classification Search
None
See application file for complete search history.

(56) References Cited

U.S. PATENT DOCUMENTS 2,985,219 A 5/1961 Summerfield
3,343,818 A 9/1967 Plemons et al.
(Continued)

*Primary Examiner* — Jethro M. Pence
(74) *Attorney, Agent, or Firm* — Pillsbury Winthrop Shaw Pittman LLP

(57) ABSTRACT

A system and method for introducing a slurry mixture for making gypsum board is disclosed. The system includes, for example, a mixer, a foam injector, and a canister for mixing and moving a slurry mixture of foam and gypsum slurry. Also included in the system is an apparatus having a funnel body constructed and arranged to further mix the slurry mixture. The funnel body includes a number of baffles projecting from its inner wall towards a center and that are spaced around the inner wall. The baffles induce turbulence into the slurry mixture as the slurry mixture moves towards its outlet, thus further mixing the mixture and reducing the flow rate of the slurry mixture before its exits from the outlet for forming the gypsum board.

24 Claims, 13 Drawing Sheets

Related U.S. Application Data continuation of application No. 15/142,090, filed on Apr. 29, 2016, now Pat. No. 10,569,237.

(60) Provisional application No. 62/155,241, filed on Apr. 30, 2015.

(51) Int. Cl.

| | |
|---|---|
| ***B01F 25/431*** | (2022.01) |
| ***B01F 25/433*** | (2022.01) |
| ***B01F 35/53*** | (2022.01) |
| ***B05C 9/10*** | (2006.01) |
| ***B05C 11/00*** | (2006.01) |
| ***B05D 3/00*** | (2006.01) |
| ***B05D 3/12*** | (2006.01) |
| ***B28B 19/00*** | (2006.01) |
| ***B28C 5/02*** | (2006.01) |
| ***B28C 5/38*** | (2006.01) |
| *B01F 23/20* | (2022.01) |
| *B01F 23/451* | (2022.01) |
| *B01F 25/00* | (2022.01) |

(52) U.S. Cl.

CPC ..... *B01F 23/451* (2022.01); *B01F 25/431971* (2022.01); *B01F 2025/916* (2022.01); *B01F 35/5312* (2022.01); *B01F 2215/0422* (2013.01)

(56) References Cited

U.S. PATENT DOCUMENTS

| | | | | |
|---|---|---|---|---|
| 4,450,022 | A | 5/1984 | Galer | |
| 5,643,510 | A | 7/1997 | Sucech | |
| 5,683,635 | A | 11/1997 | Sucech et al. | |
| 6,207,055 | B1 | 3/2001 | Satterfield et al. | |
| 6,361,201 | B1 | 3/2002 | Russell et al. | |
| 6,494,609 | B1 | 12/2002 | Wittbold | |
| 6,604,849 | B2 | 8/2003 | Lin et al. | |
| 6,742,922 | B2 | 6/2004 | Shrader et al. | |
| 7,296,919 | B2 | 11/2007 | Petersen et al. | |
| 7,311,436 | B2 | 12/2007 | Barker et al. | |
| 7,524,386 | B2 | 4/2009 | George et al. | |
| 7,654,807 | B2 | 2/2010 | Gannaway et al. | |
| 7,690,834 | B2 | 4/2010 | Nakamura et al. | |
| 7,718,019 | B2 | 5/2010 | Wittbold et al. | |
| 8,016,960 | B2 | 9/2011 | Wittbold et al. | |
| 8,066,421 | B2 | 11/2011 | Sethuraman et al. | |
| 8,322,381 | B1 | 12/2012 | Glanville | |
| 8,475,762 | B2 | 7/2013 | Li et al. | |
| 8,685,188 | B2 | 4/2014 | Yamaji et al. | |
| 8,834,145 | B2 | 9/2014 | Fahey | |
| 9,296,124 | B2 | 3/2016 | Rago et al. | |
| 9,856,168 | B2 | 1/2018 | Ueno | |
| 10,569,237 | B2 * | 2/2020 | Jones | B05C 9/10 |
| 10,856,697 | B2 * | 12/2020 | Boozer | B01F 35/5312 |
| 2003/0117891 | A1 | 6/2003 | Wittbold | |
| 2005/0288516 | A1 | 12/2005 | Warren | |
| 2006/0045975 | A1 | 3/2006 | Yamaji et al. | |
| 2006/0244182 | A1 | 11/2006 | Wittbold | |
| 2008/0101150 | A1 | 5/2008 | George | |
| 2009/0122637 | A1 | 5/2009 | Kruyer | |
| 2010/0101682 | A1 | 4/2010 | Barber | |
| 2011/0228630 | A1 | 9/2011 | Gillis et al. | |
| 2012/0167805 | A1 | 7/2012 | Wittbold et al. | |
| 2013/0168878 | A1 * | 7/2013 | Longhi | B03D 1/1431 261/74 |
| 2014/0029372 | A1 | 1/2014 | Roark, Jr. | |
| 2015/0231799 | A1 | 8/2015 | Wittbold et al. | |
| 2015/0315074 | A1 | 11/2015 | Ueno et al. | |
| 2015/0328607 | A1 | 11/2015 | Wittbold et al. | |
| 2021/0085129 | A1 * | 3/2021 | Boozer | A47J 43/0722 |

* cited by examiner

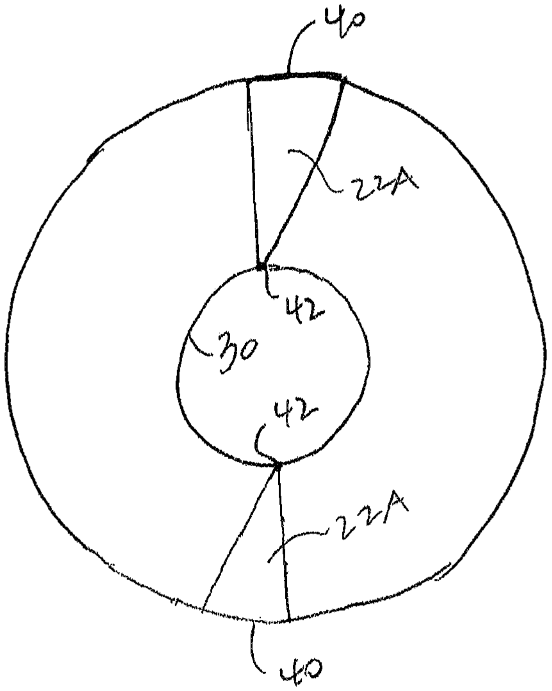
FIG. 7
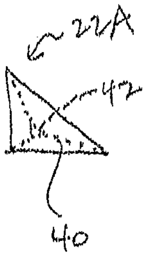
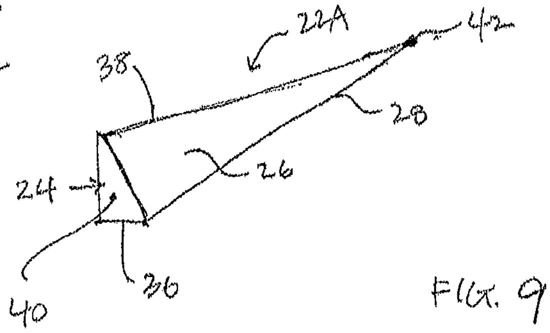
FIG. 9
FIG. 8

BAFFLED DONUT APPARATUS FOR USE IN SYSTEM AND METHOD FOR FORMING GYPSUM BOARD

CROSS REFERENCE TO RELATED APPLICATIONS

This application is a continuation of application Ser. No. 16/796,348, filed on Feb. 20, 2020, which is a continuation of U.S. application Ser. No. 15/142,090, filed on Apr. 29, 2016, issued under U.S. Pat. No. 10,569,237 on Feb. 25, 2020, which claims priority to U.S. Provisional Patent Application No. 62/155,241, filed on Apr. 30, 2015. The content of these applications are incorporated herein by reference in their entireties.

BACKGROUND

Field

The present invention is generally related to an apparatus, system, and method for mixing and depositing a slurry mixture to form gypsum board.

Description of Related Art

Conventionally, in the art of making drywall, it is generally known to and blend foam into gypsum slurry. Generally, the mixture of materials are combined and swirled to create a vortex in a mixing device of a gypsum board making system. However, this vortex tends to act like a centrifuge (i.e., which is normally designed to separate materials). That is, since the foam and slurry are materials of different densities (relatively heavy gypsum slurry and relatively light weight foam), when these materials are mixed in such a manner and exposed to centrifuge-like conditions, the foam and slurry materials may separate. As such, it has been discovered that, at times, blending of the foam and slurry may be impeded, and thus the formation of a consistent, homogeneous mixture does not occur. Quality issues in the finished gypsum board then ensue, which may include, for example, blisters, blows, voids, poor core formation, uneven drying, and low finished product strengths.

SUMMARY

It is an aspect of this disclosure to provide an apparatus for inducing turbulence into a slurry mixture for making gypsum board. The apparatus includes a funnel body having an inner wall, an outer wall, an inlet opening, and an outlet opening, and a plurality of baffles projecting from the inner wall towards a center of the funnel body. The plurality of baffles are spaced around the inner wall. The plurality of baffles are configured to induce turbulence into the slurry mixture poured into the inlet opening as the slurry mixture moves towards the outlet opening before exiting the outlet opening.

Another aspect provides a system for introducing a slurry mixture for making gypsum board. The system includes a mixer constructed and arranged to mix slurry to a first flow rate and direct the mixed slurry to an exit gate, a foam injector constructed and arranged to inject foam into the mixed slurry in the exit gate to form a slurry mixture, a canister constructed and arranged to induce a swirl to the slurry mixture, and a funnel body connected to the canister. The funnel body has an inner wall, an outer wall, an inlet for receiving the slurry mixture from the canister, an outlet, and a plurality of baffles projecting from the inner wall towards a center of the funnel body. The plurality of baffles are spaced around the inner wall. The plurality of baffles are configured to induce turbulence into the slurry mixture poured into the inlet from the canister as the slurry mixture moves towards the outlet before exiting the outlet for depositing onto paper to form the gypsum board.

Yet another aspect of this disclosure provides a method for mixing a slurry mixture for making gypsum board. The method utilizes a system including a mixer constructed and arranged to mix slurry to a first flow rate and direct the mixed slurry to an exit gate, a foam injector constructed and arranged to inject foam into the mixed slurry in the exit gate to form a slurry mixture, a canister constructed and arranged to induce a swirl to the slurry mixture; and a funnel body connected to the canister. The funnel body has an inner wall, an outer wall, an inlet for receiving the slurry mixture from the canister, an outlet, and a plurality of baffles projecting from the inner wall towards a center of the funnel body, the plurality of baffles being spaced around the inner wall and configured to induce turbulence into the slurry mixture poured into the inlet from the canister as the slurry mixture moves towards the outlet. The method includes: mixing slurry at the first flow rate; directing the mixed slurry to the exit gate; injecting foam into the mixed slurry in the exit gate to form the slurry mixture; inducing a swirl to the slurry mixture; inducing a swirl to the slurry mixture, and depositing the slurry mixture via the outlet of the funnel body onto paper to form the gypsum board.

Other aspects, features, and advantages of the present invention will become apparent from the following detailed description, the accompanying drawings, and the appended claims.

BRIEF DESCRIPTION OF THE DRAWINGS

FIG. 7 illustrates a top view of an apparatus with tapered baffles in accordance with an embodiment of this disclosure.

FIGS. 8 and 9 illustrate side and perspective views, respectively, of the tapered baffle of FIG. 7.

DETAILED DESCRIPTION OF THE PREFERRED EMBODIMENT(S)

Figure 1A:
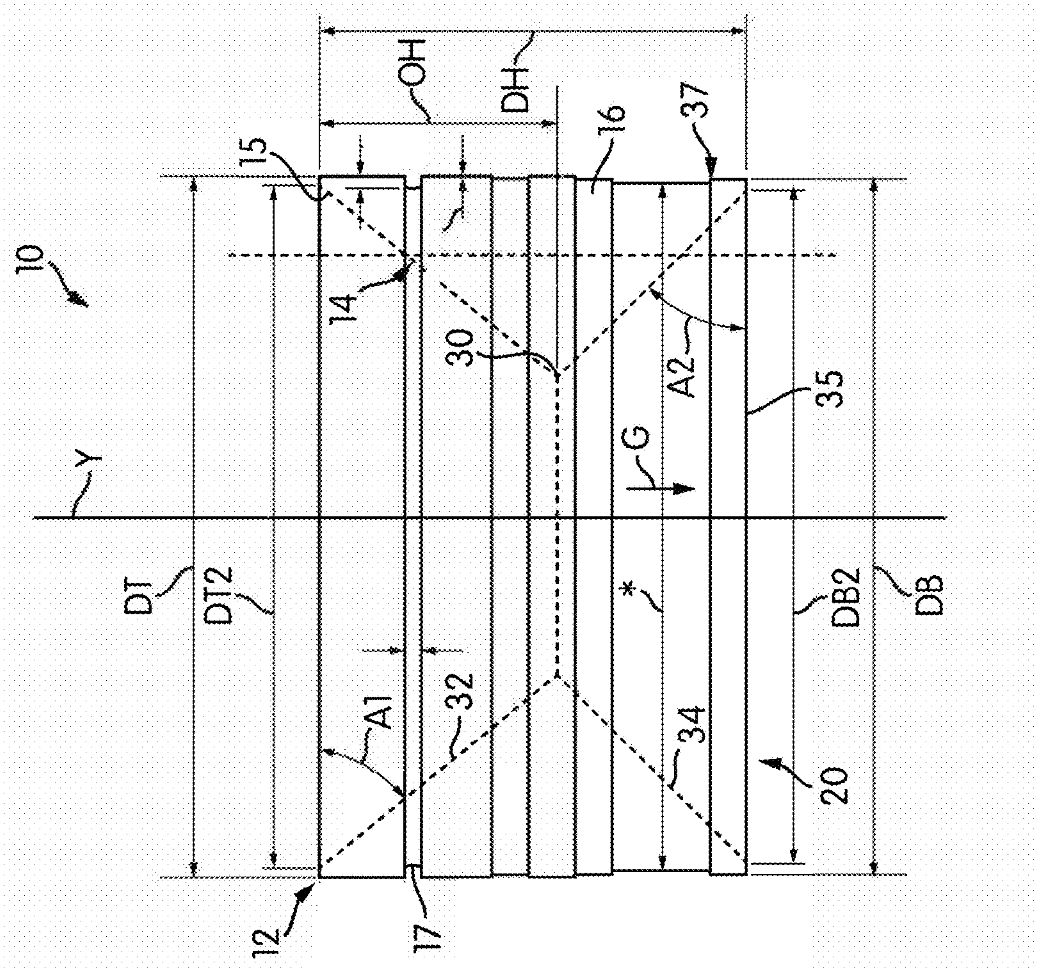
FIGS. 1A and 1B are a side view and a top view, respectively, of part of an apparatus in accordance with an embodiment of this disclosure.
Figure 1B:
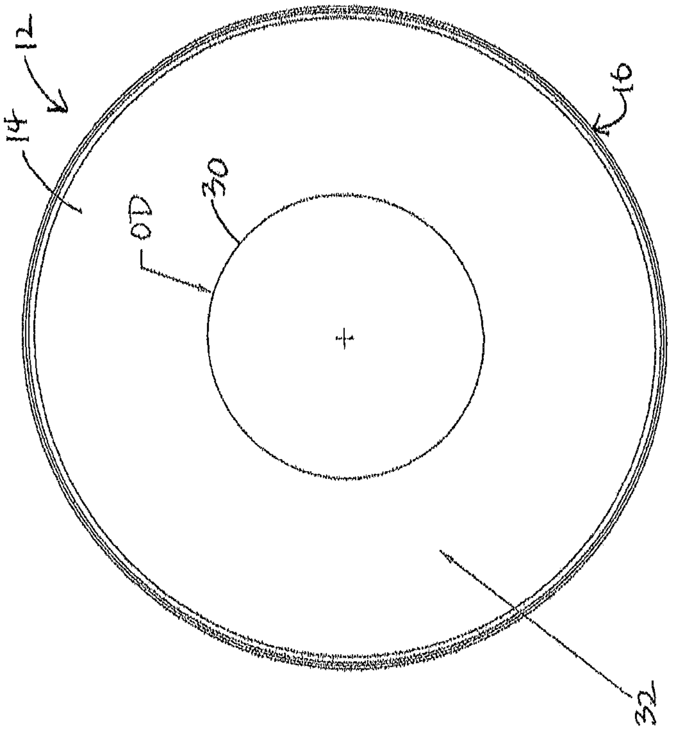

As noted in the background, slurry and foam should be mixed together as homogenously as possible in order to produce a gypsum board (or plasterboard) product of high quality (i.e., a finished gypsum board product that lacks blisters, blows, voids, and poor core formation). In order to better blend the gypsum slurry and foam together in a more homogeneous fashion, this disclosure provides an apparatus, which may be sometimes referred to as a "baffled donut" herein, that is constructed and arranged to introduce a turbulence into the mixture as it passes through, as well as further mix the slurry mixture. As will become further evident by the description below, the apparatus disclosed herein acts as both a direction-changing device and mix-inducing device for the slurry mixture.

Throughout this disclosure, reference to a "slurry mixture" refers to a mixture of at least slurry and (aqueous) foam. That is, since the slurry is mixed before foam is injected therein, the term "slurry mixture" is used to clarify the product that is input into the disclosed baffled donut apparatus.

FIGS. 1-5 illustrate views of the baffled donut apparatus 10 for inducing turbulence into a slurry mixture for making gypsum board in accordance with the disclosure. The baffled donut apparatus 10 has a funnel body 12 having an inner wall 14, an outer wall 16, an inlet opening 15, and an outlet opening 30. The inner wall 14 is generally spaced from the outer wall 16. The inlet opening 15 is provided at a top portion 18 of the body 12, and the outlet opening 30 may be provided at or near a bottom portion 20 of the body 12. As described in greater detail later, the slurry mixture is introduced into the funnel body 12 via the inlet opening 15, and generally swirled (e.g., see arrows A) within the body downwardly towards the outlet opening 30.

In the embodiment as shown in FIG. 1A, a second outlet opening 35 is provided. That is, the inside of the funnel body 12 include an upper side 32 and a lower side 34. The inner wall 14 in this illustrated embodiment is provided on the upper side 32 of the body 12, with the inlet opening 15 provided at the top portion 18. The outlet openings 30 and 35 define the lower side 34. The outlet opening 30 may be provided within the body (e.g., in a midsection thereof), and the second outlet opening 35 is provided at the bottom portion 20. Although FIG. 1A shows the inner wall 14 extending between a top edge of the inlet opening 15 and an edge of the outlet opening 30 on the upper side 32, this illustration is not intended to be limiting.

The lower side 34 may include an angled wall that extends between the edge of the outlet opening 30 and an edge of the second outlet opening 35. However, this illustration is not intended to be limiting. The angled wall may assist in substantially reducing and/or eliminating any dead space and/or backup in the mixture or material as it is deposited from the outlet opening 30 and the second outlet opening 35.

In another embodiment, a lower side 34 and a second outlet opening 35 are not provided in the funnel body 12. That is, the inner wall 14 may extend between the inlet opening 15 at the top portion 18 of the body 12 and the outlet opening 30 at a bottom portion 20.

The funnel body 12 has an overall height DH. The outlet opening 30 may be provided at an outlet height OH measured from a top edge of the funnel body 12 to an edge of the outlet opening 30.

The top edge of the funnel body 12 has a top dimension DT. The inlet opening 15 has an opening dimension DT2. In an embodiment, the opening dimension DT2 of the inlet opening 15 is slightly smaller than the top dimension DT of the top edge. In an embodiment, the top dimension DT is approximately 7 inches (e.g. +/−5%). In an embodiment, the opening dimension DT2 is approximately 6.85 inches (e.g. +/−5%). In another embodiment, DT and DT2 may be equal. Of course, any dimensions noted above may be adjusted based on the system or apparatus being used, as well as the desired dimension of the outlet opening 30.

The bottom edge of the funnel body 12 has a bottom dimension DB. The second outlet opening 35 has an opening dimension DB2. In an embodiment, the opening dimension DB2 of the second outlet opening 35 is slightly smaller than the bottom dimension DB of the bottom edge. In an embodiment, the bottom dimension DB is approximately 7 inches (e.g. +/−5%). In an embodiment, the opening dimension DB2 is approximately 6.75 inches (e.g. +/−5%). In another embodiment, DB and DB2 may be equal. Of course, any dimensions noted above may be adjusted based on the system or apparatus being used, as well as relatively adjusted based on a desired dimension of the outlet opening 30 (discussed further below). In an embodiment, the size or diameter DB2 of the second outlet opening 35 may vary. The size of the second outlet opening 35 may variably depend on a line speed (speed or rate at which the mixed slurry is being delivered) and the type of product being mixed.

The inner wall 14 of the baffled donut apparatus 10 may be provided at an acute angle relative to a longitudinal axis Y that extend through a center of the outlet opening 30, for example. In an embodiment, the inner wall 14 has a slope of approximately 45 degrees (e.g. +/−5%) relative to the longitudinal axis Y. In another embodiment, as shown in FIG. 1A, for example, the inner wall 14 may be provided at an acute angle A1 relative to a plane that extends across the inlet opening 15 (or a top) of the funnel body 12. In an embodiment, the angle A1 of the inner wall 14 may be within a range between approximately 40 degrees (inclusive) (e.g. +/−5%) and approximately 60 degrees (inclusive) (e.g. +/−5%). In an embodiment, the angle A1 of the inner wall 14 may be approximately 52 degrees (e.g. +/−5%). In other embodiments, the slope of the inner wall 14 may vary, for example, based on the size of the outlet opening 30.

Figure 3:
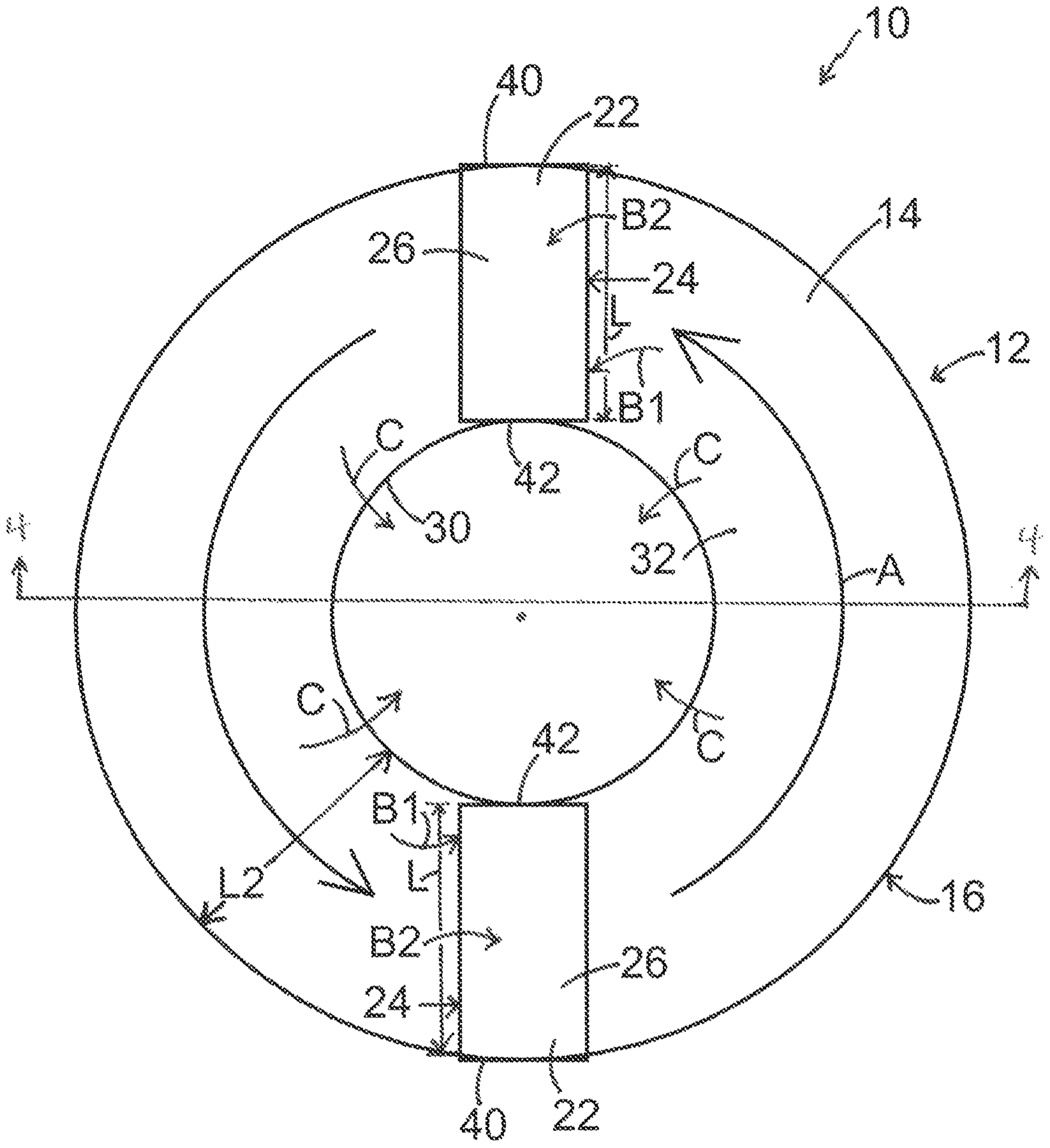
FIG. 3 is a top view of the apparatus of FIGS. 2A and 2B.

The inner wall 14 may also have a length L2 that extends between the top edge of the inlet opening 15 and an edge of the outlet opening 30, as shown in FIG. 3, for example. In accordance with an embodiment, the length L2 is approximately 3 inches long (e.g. +/−5%). However, it should be understood that the length of the inner wall 14 may vary based on many factors, including, but not limited to, the size or diameter of the donut hole or outlet opening 30, the size or diameter of the assembly or funny body 12, and/or the angle A1 of the sides or inner wall 14 of the funnel body 12. For example, the length L2 may range from approximately 1.5 inches (inclusive) (e.g. +/−5%) to approximately 5 inches (inclusive) (e.g. +/−5%), or more.

The outlet opening 30 has an outlet diameter OD. In an embodiment, the size or diameter OD of the outlet opening 30 may vary from as little as approximately 1 inch (inclusive) (e.g. +/−5%) to as much as approximately 7 inches (inclusive) (e.g. +/−5%), or more. The size of the outlet opening 30 may variably depend on a line speed (speed or rate at which the mixed slurry is being delivered) and the type of product being mixed. In an embodiment, the outlet opening 30 may have a diameter OD in the range of approximately 3 inches (inclusive) (e.g. +/−5%) to approximately 7 inches (inclusive) (e.g. +/−5%).

The angled wall of the lower side 34 may be provided at an acute angle relative to a longitudinal axis Y that extends through a center of the outlet opening 30, for example. In an embodiment, the angled wall has a slope of approximately 45 degrees (e.g. +/−5%) relative to the longitudinal axis Y. In another embodiment, as shown in FIG. 1A, for example, the angled wall of the lower side 34 may be provided at an acute angle A2 relative to a plane that extends across the second outlet opening 35 (or a bottom) of the funnel body 12. In an embodiment, the angle A2 of the angled wall may be within a range between approximately 35 degrees (inclusive) (e.g. +/−5%) and approximately 55 degrees (inclusive) (e.g. +/−5%). In an embodiment, the angle A2 of the angled wall may be approximately 46 degrees (e.g. +/−5%). In other embodiments, the slope of the angled wall may vary, for example, based on the size of the second outlet opening 35 and/or outlet opening 30.

In accordance with an embodiment, the angle A1 of the inner wall 14 may be larger or steeper than the angle A2 of walls of the lower side 34. Again, both angles A1 and A2 may vary based on any number of factors, including, but not limited to the size of the outlet opening 30 and/or the type of material being swirled, induced, and delivered, for example.

Other features may be provided on the funnel body 12, which are generally shown in the Figures. For example, the outer side wall of the body 12 may include a stepped configuration and/or grooves that assist in mounting and securing the baffled donut apparatus. As shown in FIG. 1A, for example, one or more grooves 17 for an O-ring may be provided on an outer side wall of the body 12 such that when a top of the baffled donut apparatus is slid into and mounted with a canister of a mixing system, it is secured therein. Similarly, grooves and/or steps may be formed on the body 12 so that a bottom of the baffled donut apparatus is mounted and/or clamped by a mixer boot in the mixing system. The grooves may form a lip, such as indicated by 37, to assist in clamping the parts of the system together, for example. Such features may be machined into the funnel body 12 during manufacturing, or molded or formed in the body, as needed.

Figure 2A:
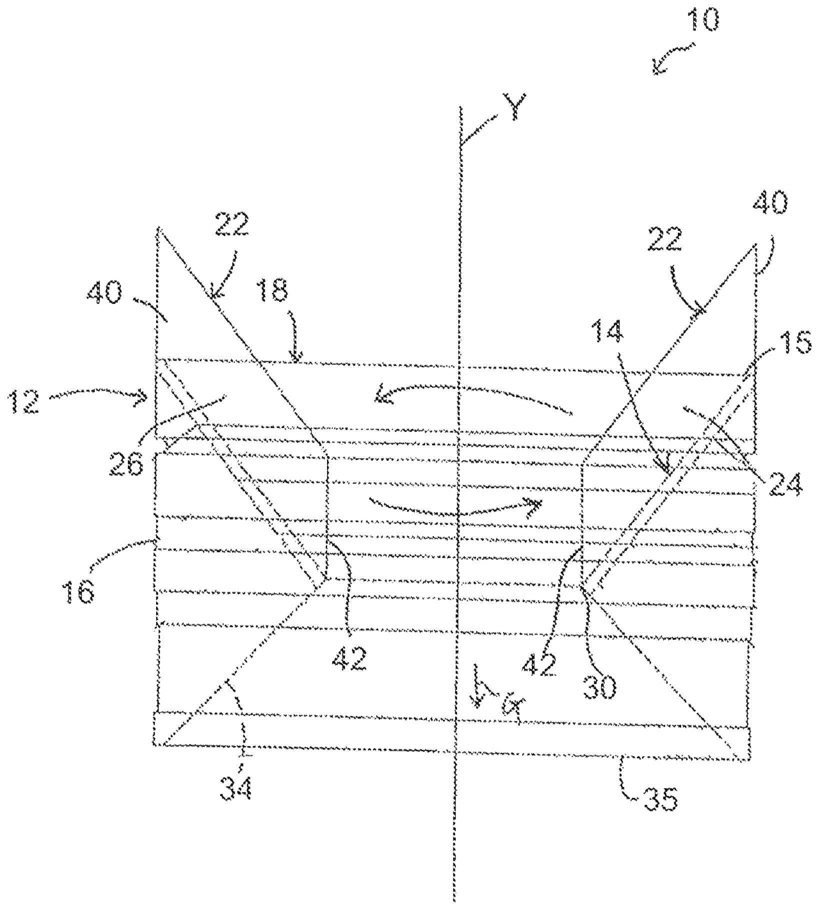
FIGS. 2A and 2B are a side view and a top view, respectively, of the apparatus of FIGS. 1A and 1B showing a location of baffles included therewith.

In addition to the above noted features, the baffled donut apparatus includes a number of baffles 22 projecting from the inner wall 14 towards a center of the funnel body 12. The baffles 22 are static devices that may aid in regulating the flow of the slurry mixture. The baffles 22 induce turbulence into the slurry mixture poured into the inlet opening 15 as the slurry mixture moves towards the outlet opening 30 (before exiting). It should be noted that the baffles 22 were eliminated from FIG. 1 merely to simplify the drawing and to more clearly illustrate features of the body 12 previously described. However, FIG. 2A illustrates an example positioning of the baffles 22 on the inner wall 14 of the funnel body 12 (see also FIGS. 3-5) of the herein disclosed baffled donut apparatus 10.

Figure 5:
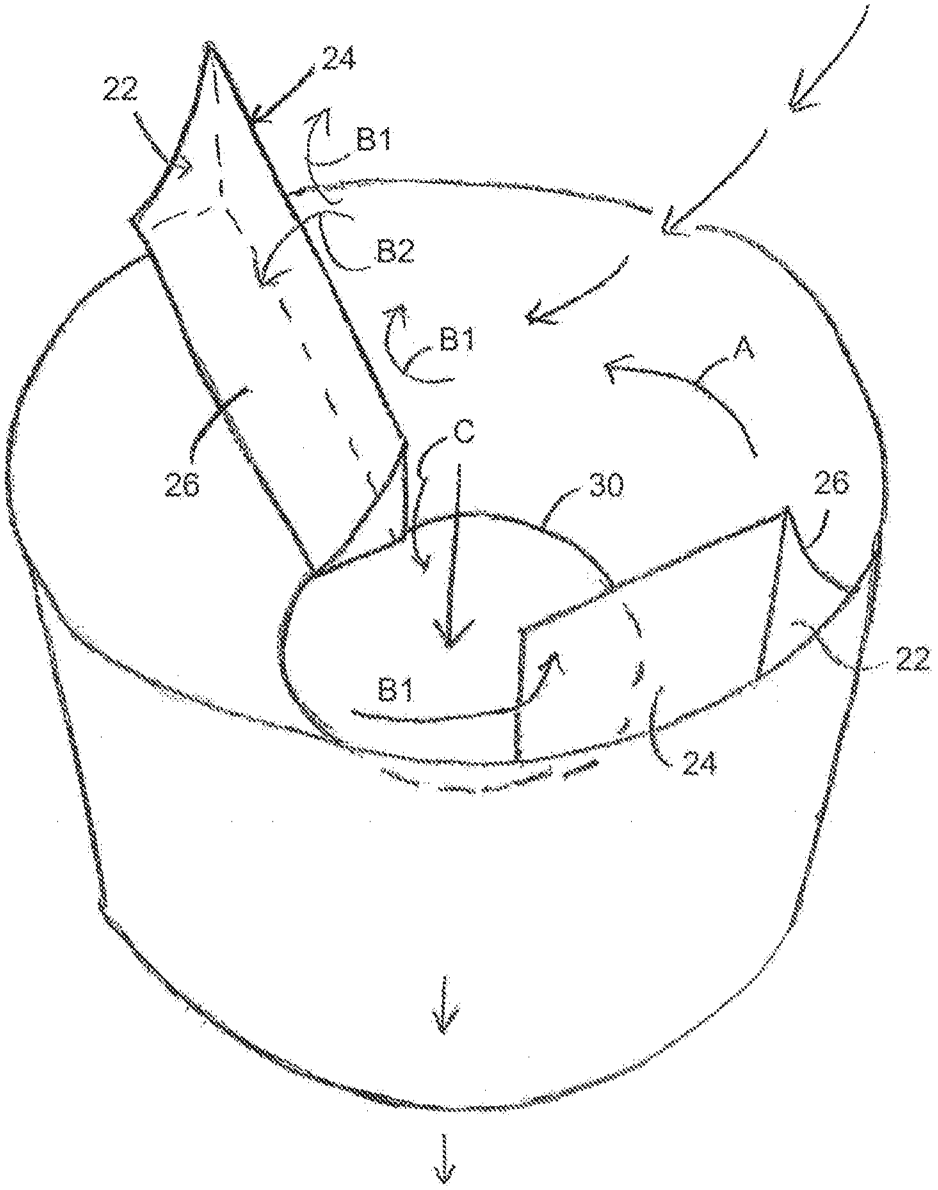
FIG. 5 is a perspective view of the apparatus of FIGS. 2A and 2B.

As shown in FIGS. 3 and 5, for example, the baffles 22 are spaced on and around the inner wall 14. For illustrative purposes only, two baffles 22 are shown. Such illustrations are not intended to be limiting, however. As further noted below, any number of baffles may be included in and/or on the funnel body 12.

In an embodiment, the baffles 22 are spaced equidistantly relative to one another on and around the inner wall 14. In another embodiment, the baffles 22 are provided sporadically along the inner wall 14.

As shown in FIG. 3, each baffle 22 has a length L. The length L extends between the inlet opening 15 and the outlet opening 30. In an embodiment, the length L of the baffle 22 is similar or substantially equal to the length L2 of the inner wall 14; that is, the baffle 22 extends from an edge of the inlet opening 15 to the edge of the outlet opening 30. In another embodiment, the length L of the baffle 22 is less than the length L2 of the inner wall 14. In yet another embodiment, the length L of the baffle 22 is greater than length L2 of the inner wall 14. In accordance with an embodiment, the length L of each baffle is approximately 3 inches (e.g. +/−5%). However, it should be understood that the length L of each of the baffles 22 may vary. For example, in an embodiment, the length L of each baffle ranges from approximately 1.5 inches (inclusive) (e.g. +/−5%) to approximately 5 inches (inclusive) (e.g. +/−5%). In an embodiment, the length L is approximately 3 inches (e.g. +/−5%).

Figure 6:
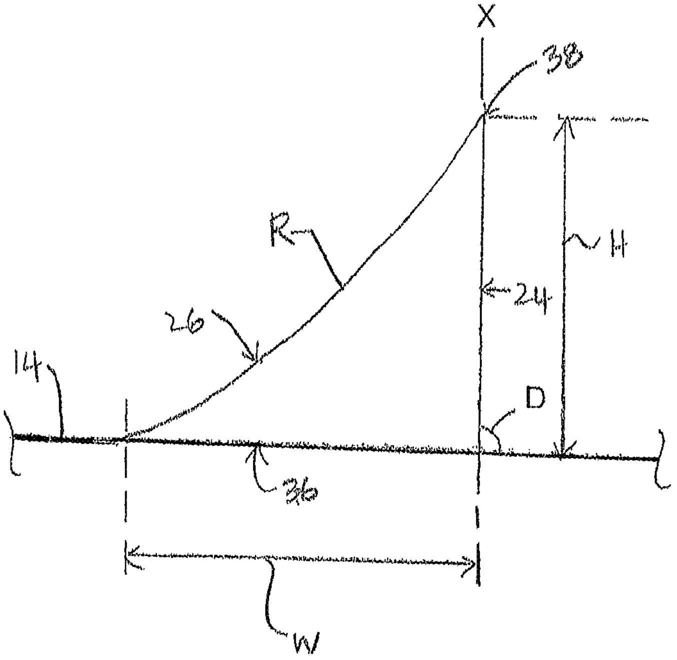
FIG. 6 is a side, detail view of a baffle provided on the apparatus in accordance with an embodiment.

FIG. 6 illustrates a side view from one side of the baffle 22. As shown, each of the baffles 22 has a top 38 and a bottom side 36, a leading edge 24 and a trailing edge 26. The top 38 is an edge that runs a length L of the baffle 22. In an embodiment, such as generally illustrated in FIG. 2A, the top 38 of each of the baffles 22 has a slope that is the same as a slope of the inner wall 14. For example, the top 38 may be provided at an acute angle relative to the longitudinal axis Y. In an embodiment, the top 38 is provided approximately 52 degrees (e.g. +/−5%) relative to the plane that extends across the inlet opening 15 (or a top) of the funnel body 12. Accordingly, the slope of the top 38 and slope of the inner wall 14 may be parallel to one another.

Figure 2B:
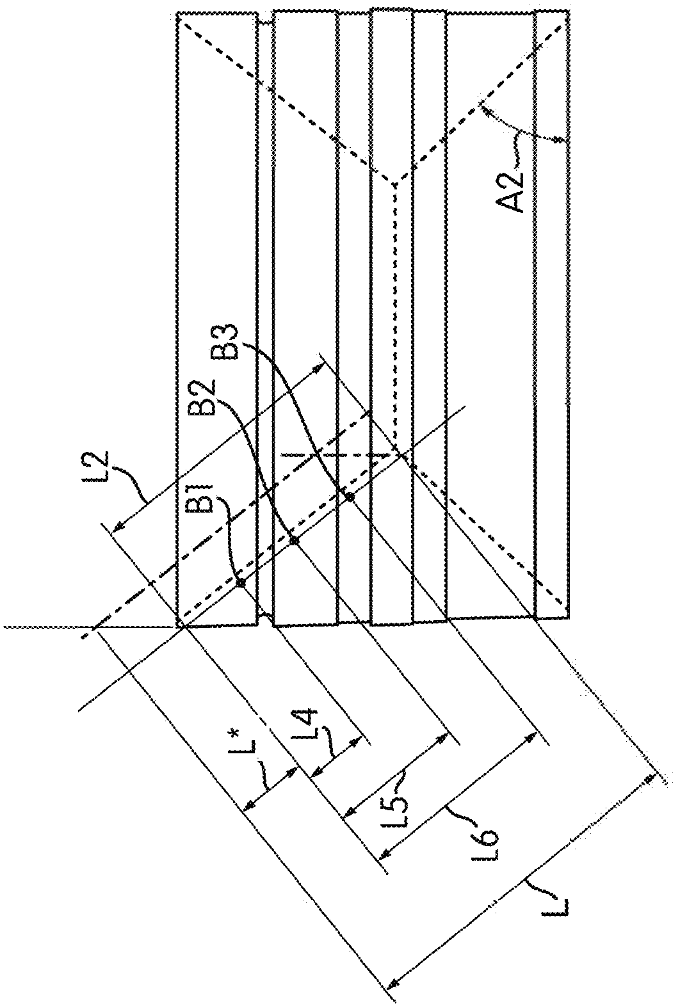

The bottom side 36 may also run the length L of the baffle 22. The bottom side 36 includes a width W extending from the leading edge 24 to an end of the trailing edge 26, as shown in FIG. 6. The width W of each baffle may vary. The bottom side 36 is attached the inner wall 14. In accordance with an embodiment, the bottom side 36 is attached to the inner wall 14 using a glue or adhesive. In another embodiment, the baffle 22 is integrally formed with the funnel body 12, and thus the bottom edge 36 of the baffle 22 is an integral part of the inner wall 14. In yet another embodiment, each baffle 22 is bolted into the funnel body 12. For example, as illustrated in FIG. 2B, a number of bolts B1, B2, and B3 may be used to secure each baffle 22 to an inner wall 14 of the funnel body 12. The baffles 22 and the inner wall 14 of the funnel body 12 may each optionally include holes or openings for receipt of the bolts therein. The bolts B1-B3 may be provided at different lengths L4, L5, and L6 respectively relative to a top edge of the body 12. In an embodiment, the bolts B1-B3 are spaced equidistantly relative to one another, along the length L2 of the baffle 22. Of course, it should be understood that the number of bolts used to secure the baffle 22 may vary.

The leading edge 24 of each baffle 22 may be provided at an angle D relative to a plane on the inner wall 14, as shown in FIG. 6. In an embodiment, the leading edge 24 is perpendicular to the inner wall 14. In an embodiment, the angle D at which the leading edge is positioned relative to a plane of the inner wall 14 is approximately 90 degrees (e.g. +/−5%). The positioning of the leading edge 24 of the baffle 22 in this way may induce maximum turbulence and prevent build up from forming on the face of the baffle. Alternatively, the leading edge 24 could be provided at an acute or obtuse angle relative to the inner wall 14. The leading edge 24 also has a height H that is extends from the bottom side 36 to the top 38, as shown in FIG. 6. In accordance with an embodiment, the height H of the leading edge 24 ranges from approximately ¾" (inclusive) (e.g. +/−5%) to approximately ⅜" (inclusive) (e.g. +/−5%).

The trailing edge 26 is designed to induce as much turbulence as possible in the slurry mixture and simultaneously prevent build up from forming in the funnel body 12. The trailing edge 26 or side may include a curved or radiussed surface that extends from the leading edge towards the inner wall. In an embodiment, the radius R of the trailing edge 26 is within a range of approximately 5 degrees (e.g.

+/−5%) to approximately 20 degrees (e.g. +/−5%). In one embodiment, the radius R of the trailing edge 26 is approximately 10 degrees (e.g. +/−5%). Alternatively, the trailing edge 26 may be an angled surface. For example, in an embodiment, the trailing edge of the baffle 22 is a relative 45 degrees (e.g. +/−5%). The trailing edge angle and/or radius prevents buildup from forming. In an embodiment, more radius may be provided on the trailing edge 26 for a side that includes a steeper angle (e.g., approximately 45 degrees (e.g. +/−5%)). In an embodiment, less or no radius may be for a shallower angle (e.g., approximately 25 degrees (e.g. +/−5%) or less).

In accordance with an embodiment, a shallower angle (e.g., approximately 25 degrees (e.g. +/−5%) or less) on the trailing edge, if possible, may be used for fewer baffles, e.g., for two or three baffles, provided around the funnel body 12. If several or more baffles are included, e.g., if four or more baffles are provided on the funnel body 12, then a steeper angle (e.g., approximately 45 degrees (e.g. +/−5%), or greater than 25 degrees (e.g. +/−5%)) may be used, in accordance with an embodiment, so as to not disturb the turbulence inducing effect of the vertical leading edge of the next baffle.

Figure 4:
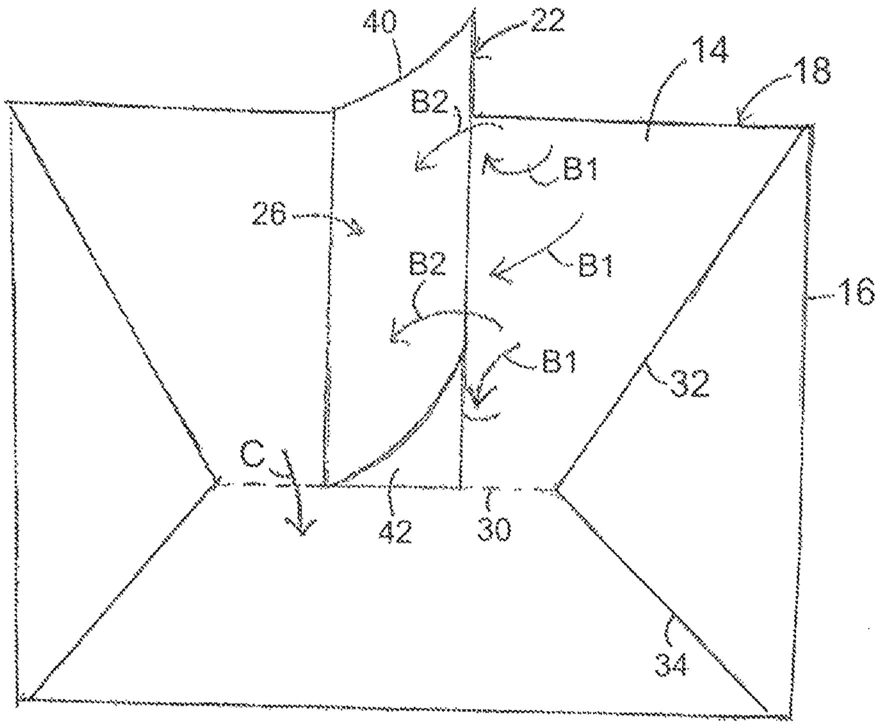
FIG. 4 is a cross-sectional view taken along line 4-4 in FIG. 3.

Each of the baffles 22 also has a first side 40 and a second side 42, as seem in FIG. 4, for example. The first side 40 may be provided near a top edge, while the second side 42 is provided near the outlet opening 30. As seen in FIG. 2A, the first side 40 of a baffle 22 may extend a length (L*, shown in FIG. 2B) beyond a plane of, or above a surface of, the top edge of the funnel body 12. The baffles 22 may be aligned with and match a curvature of an adjacent part, i.e., a canister, to extend into a bottom portion of that part. By extending above the top edge, then, as the mixed slurry material is swirled (e.g., in the canister), the baffles 22 may interact with the swirl sooner. The second side 42 of the baffle 22 may be positioned vertically relative to a centerline and aligned with the outlet opening 30, as shown in FIG. 2A, so as not to inhibit movement of the slurry mixture through.

As illustrated in FIGS. 2A, 3, and 5, the baffles 22 may be positioned in a symmetrical manner along and around the inner wall 14 of the baffled donut apparatus 10. For example, in an embodiment, the leading edge 24 of each baffle 22 is positioned symmetrically relative to the longitudinal axis Y. That is, as seen in FIG. 5, for example, the leading edges 24 of each baffle 22 are aligned and the curved trailing edges 26 are provided in similar direction, such that they may induce turbulence and overflow (over the leading edge 24) and mixing of the slurry mixture in the same direction (e.g., counterclockwise). The positioning of the leading edges 24 of the baffles 22 may be determined based on the swirling flow of the slurry mixture as it is introduced into the baffled donut apparatus 10. For example, in FIG. 5, as the slurry mixture is introduced and swirled in a counterclockwise direction A, and moves via the vortex (arrows A) and gravity (arrow Gin FIG. 1) towards the outlet 30, the leading edges 24 of each of the baffles 24 may be positioned such that the slurry mixture will abut the leading edge 24 first. As the swirling mixture engages the baffles 22, as indicated in FIGS. 3, 4, and 5, when the slurry mixture impacts the leading edge 24 of the baffle 22, it is redirected as indicated by arrows B1 and B2 in another direction (a direction other than the swirling direction creating by the vortex, e.g., diagonal or downwardly towards outlet opening 30) (arrow B1) and/or over the leading edge 24 of the baffle 22 (arrow B2). This is so that the plurality of baffles 22 to induce turbulence into the slurry mixture poured into the inlet opening 18 as the slurry mixture moves towards the outlet opening 30 before exiting the outlet opening 30 and to further mix the slurry mixture. More specifically, the baffles 22 are designed to disrupt the "centrifuge-effect" of the spinning vortex of slurry mixture, and create a turbulence that folds the slurry mixture (i.e., folds the foam stream and the slurry stream into one another), forcing a more homogenous blend. Then the slurry mixture moves downwardly towards the outlet opening 30.

The velocity of the moving, spinning slurry mixture stream is thus used by the static baffles 22 to create turbulence, agitation, and induce mixing and blending.

FIGS. 7-9 illustrate another embodiment of a baffle 22A that may be used in the baffled donut apparatus 10 that has a tapered configuration. As shown, the baffle 22A tapers along its length, from one side 40 to the other side 42. In an embodiment, the baffle 22A tapers towards the outlet opening 30. More specifically, the top 38 of each of the baffles 22A in FIGS. 7-9 has a slope that is different than (e.g., greater than) a slope of the inner wall 14. For example, as seen in FIG. 9, the top 38 slopes relative to the bottom side 36 of the baffle 22A from the first side 40 towards the second side 42. Accordingly, the slope of the top 38 may be greater than the slope of the inner wall 14. As shown in FIG. 7, in an embodiment, the baffles 22A may be positioned such that the first side 40 of each baffle 22A is positioned adjacent to the top edge of the funnel body 12, and the second side 42 of the baffle 22A is positioned adjacent the edge of the outlet opening 30. In another embodiment, the baffles 22A may be positioned such that the second side 42 of each baffle 22A is positioned adjacent to the top edge of the funnel body 12, and the first side 40 of the baffle 22A is positioned adjacent the edge of the outlet opening 30. In yet another embodiment, the positioning of the baffles 22A may be alternated such that the positioning and direction of the tapers vary around the funnel body 12.

Figure 10:
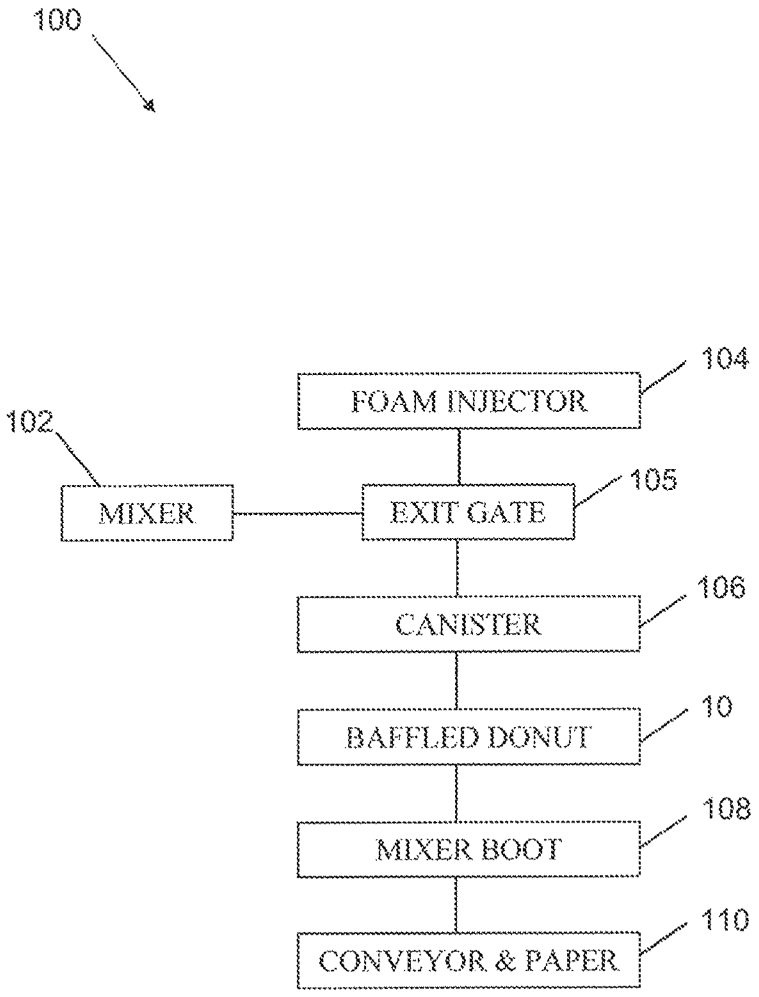
FIG. 10 illustrates a system that utilizes the apparatus of FIGS. 2A and 2B in accordance with an embodiment of this disclosure.

FIG. 10 illustrates a system 100, in accordance with an embodiment of this disclosure, that utilizes the baffled donut apparatus 10 as disclosed herein, for introducing a slurry mixture and for making gypsum board. The system 100 includes a mixer 102, a foam injector 104, a canister 106, the baffled donut apparatus 10, a mixer boot 108, and a conveyor 110. The mixer 102 is constructed and arranged to mix gypsum slurry to a first flow rate. Although not shown or described in great detail herein, one of ordinary skill in the art should understand that the mixer 102 includes at least a mixing chamber, a rotor, and an outlet, as well as a material supply (e.g., semi-hydrate calcium sulphate) and a water supply (or other liquid or fluid) associated therewith, and any number of orifices or nozzles. The mixer may be designed such that dead zones are limited in the mixing chamber so that risk of clogging the mixer is reduced or eliminated. A tubular element and a collecting element may connect to an outlet orifice in the mixer, and a pressure regulating element and transport element may be provided on the mixer. The mixed slurry is directed from the mixer 102 to an exit gate 105. A foam injector 104 injects foam into the mixed slurry in the exit gate to form a slurry mixture. This slurry mixture is directed to the canister 106. The canister 106 induces a swirl to the slurry mixture. It may optionally flow at a second flow rate. In an embodiment, the second flow rate is lower than the first flow rate. In some cases, the slurry mixture flows at the same flow rate. The baffled donut apparatus 10 may be connected to the canister 106. In an embodiment, the apparatus 10 is directly connected to the canister 106. The funnel body 12 of the baffled donut apparatus 10 further induces a swirl (e.g., see arrows A) into the slurry mixture as it flows therethrough. The entire canister assembly, including the baffled donut, is stationary.

The system 100 including the baffled donut apparatus 10 enables production of a core structure with bigger bubbles, resulting in a finished product that has an improved or better core, by forcing coalescence of the bubbles in the slurry mixture.

Of course, it should be understood that the baffled donut apparatus 10 used in system 100 may be similar to the previously disclosed embodiments. That is, it includes a number of baffles 22 projecting from the inner wall 14 towards a center of the funnel body and spaced around the inner wall 14. The baffles 22 are configured to induce turbulence into the slurry mixture poured into the inlet from the canister 106 as the slurry mixture moves towards the outlet 30 to further swirl and mix the slurry mixture before it exits the outlet for depositing onto paper to form the gypsum board.

Accordingly, the system 100 slows, mixes, and redirects the discharge of slurry from a main mixer. Without this assembly, the slurry may likely exit the mixer at too high of a velocity to be controllable. The slurry would also be too high in elevation in relation to the paper for which it is deposited. Thus, the deposited slurry mixture may not be spread evenly across the paper. Such a combination of too high of a velocity and too sharp of an angle of deposit onto the paper generally results in great difficulties in forming gypsum board, let alone of product of high quality. The result (as seen in the prior art) may include poor edge formation, an inability to form a consistent board profile, and excessive voids (hollow areas) in the finished product. The end product would also have inconsistent density across the finished product, leading to inconsistent strength, poor drying in the kiln, and the need for excessive additives to try to compensate for the inconsistent formation and cross-profile density.

In addition to the gate/canister/donut assembly being used to slow and redirect the gypsum slurry onto the paper for formation, the assembly is also used to inject and entrain foam into the slurry. The movement of foam from being injected into the center of the main mixer and into the gate assembly has many proven advantages, among them being less soap usage, better core formation, easier drying, and higher quality finished product strength, which allows for lighter finished product weight. The baffled donut assembly 10 aids in optimizing this system design and optimizing the process and steps for injecting and mixing in such a manner.

In an embodiment, a mixer boot 108 is provided in the system 100 and receives the slurry mixture exiting from the outlet 30 of the baffled donut apparatus 10. The mixer boot 108 may deposit the slurry mixture onto (or in between) paper that is being conveyed by conveyor 100, to make the gypsum board.

As an example, the flow rate at which the slurry mixture is poured into the canister 106 may range from approximately 3500 lbs/min (e.g. +/−5%) to approximately −5200 lbs/min (e.g. +/−5%). The flow rate of the slurry mixture as it exits the outlet opening 30 of the baffled donut apparatus may range from approximately 3500 lbs/min (e.g. +/−5%) to approximately 5200 lbs/min (e.g. +/−5%).

Of course, it should be understood that the number of baffles 22 included along inner wall 14 is not intended to be limited to the illustrated embodiments. Although two baffles are shown, for example, in the Figures, a single baffle may be provided on the inner wall. Alternatively, three or more baffles may be positioned along the inner wall 14 of the funnel body 10.

Although the baffles 22 as disclosed herein are all similar in shape, size, and dimension, it should be noted that each baffle 22 provided on the inner wall 14 of the funnel body 12 need not all be similar in shape, size, and/or dimension. In an embodiment, the baffles 22 may be dimensioned to optimize for different line speeds, products, etc. For example, in accordance with an embodiment, multiple baffles 22 may be positioned around the inner wall 14 and include different lengths L (different lengths extending between the inlet 18 and the outlet 30 and that differ from the length L2 of the inner wall 14 and length L of another baffle). In an embodiment, one or more baffles 22 provided on the inner wall 14 may have differing width(s). For example, if a single baffle 22 is provided in the funnel body 10, the width W of the baffle may be designed to extend one-third of the way around the funnel (relative to the circumference, for example). In an embodiment, the heights H of leading edges 24 of any of the baffles 22 may vary. In another embodiment, the trailing edges 26 of one, some, or all of baffles 22 may include different curves or radiuses R. In addition or alternatively, the baffles may include different angles and/or different radiussed surfaces (e.g., 180 degrees). Baffles may also be of different shapes.

EXAMPLE TEST

A donut apparatus having a configuration and construction as disclosed herein was manufactured and installed and tested in a mixing and gypsum board forming system, like system 100, to evaluate effectiveness of the disclosed donut apparatus on reducing blows and blisters in a finished gypsum product. The test was performed with an approximate 13 hour run. The settings were as follows:

Foam formulation settings: Normal
Foam Water: 120 lbs/msf
Foam Air: 20 lbs/msf
Soap: 0.69 lbs/msf During testing, the system and product were observed during processing. In the system, it was initially observed that the output slurry mixture stream was smoother with minimal scalloping. Also, any movement of the mixer boot in the system was less than usual.

Figure 11:
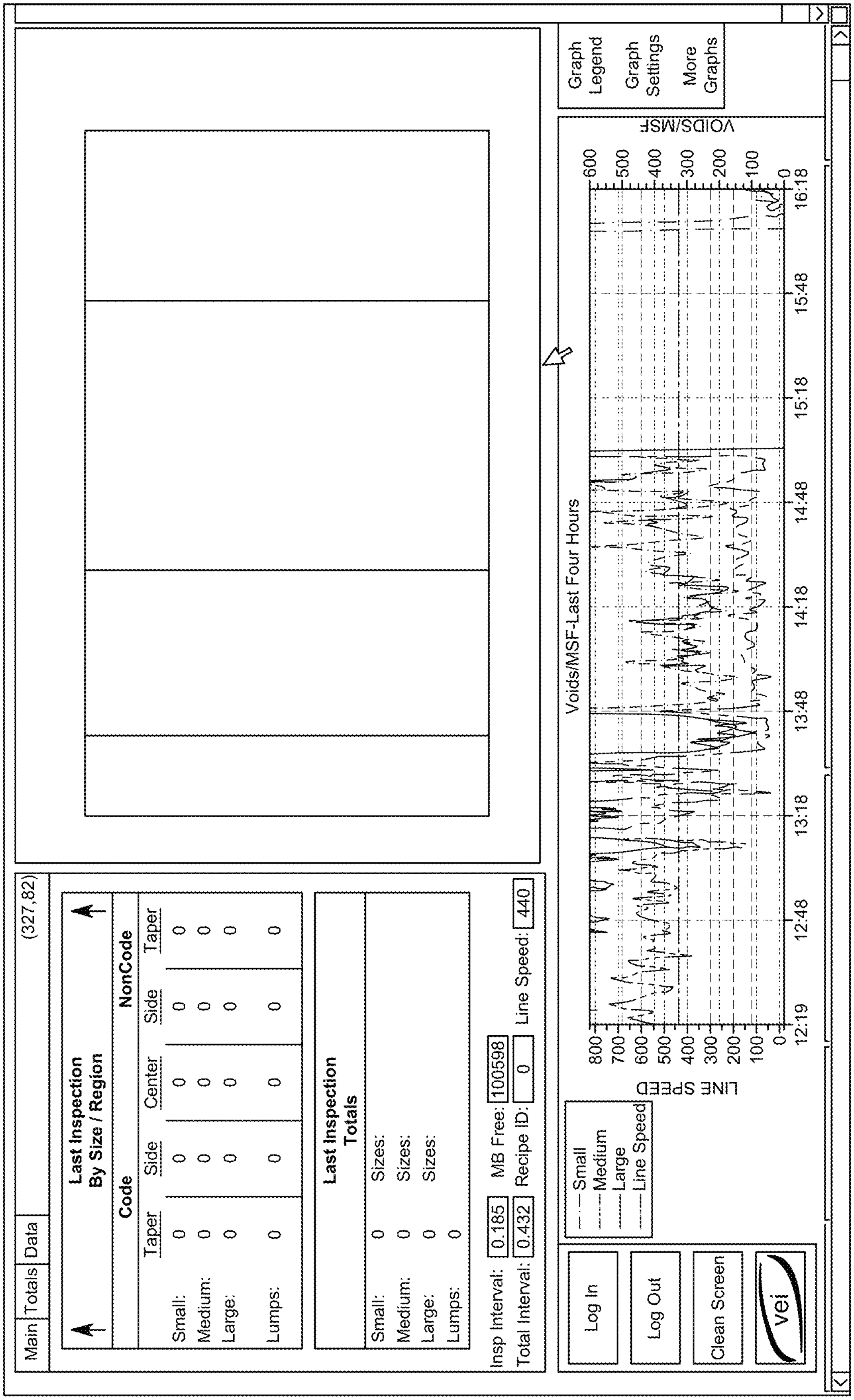
FIG. 11 is a screenshot of a program used during implementation of the disclosed apparatus.

FIG. 11 is a screenshot of a void detection system program output from a measurement system, that was used during implementation of the disclosed apparatus. The measurement system was located at the wet transfer point at the end of the forming belt conveyors, prior to the board being cut to length and entering the kiln. The chart's vertical axis is voids/msf; the horizontal axis is time. Msf is "thousand square feet" (the units of measure used to track board production).

In particular, these results demonstrate the reduction in voids with the use of the baffled donut. The four hour window shown in the screenshot of FIG. 11 illustrates a transition from ⅝" product to ½" product being measured. As shown, between 14.48-15.16, on a ⅝" product being measured, the voids drop to approximately zero. In the ½" product, which was measured after 15:16, substantially no voids were detected.

With regards to the product itself, its core structure appeared more pronounced and defined than usual, with a more defined bubble structure. In addition, no blisters were noticed after 5 hours of running the system with the baffled donut apparatus therein.

Accordingly, the baffled donut apparatus had a positive effect of eliminating voids in the final product.

Figure 12:
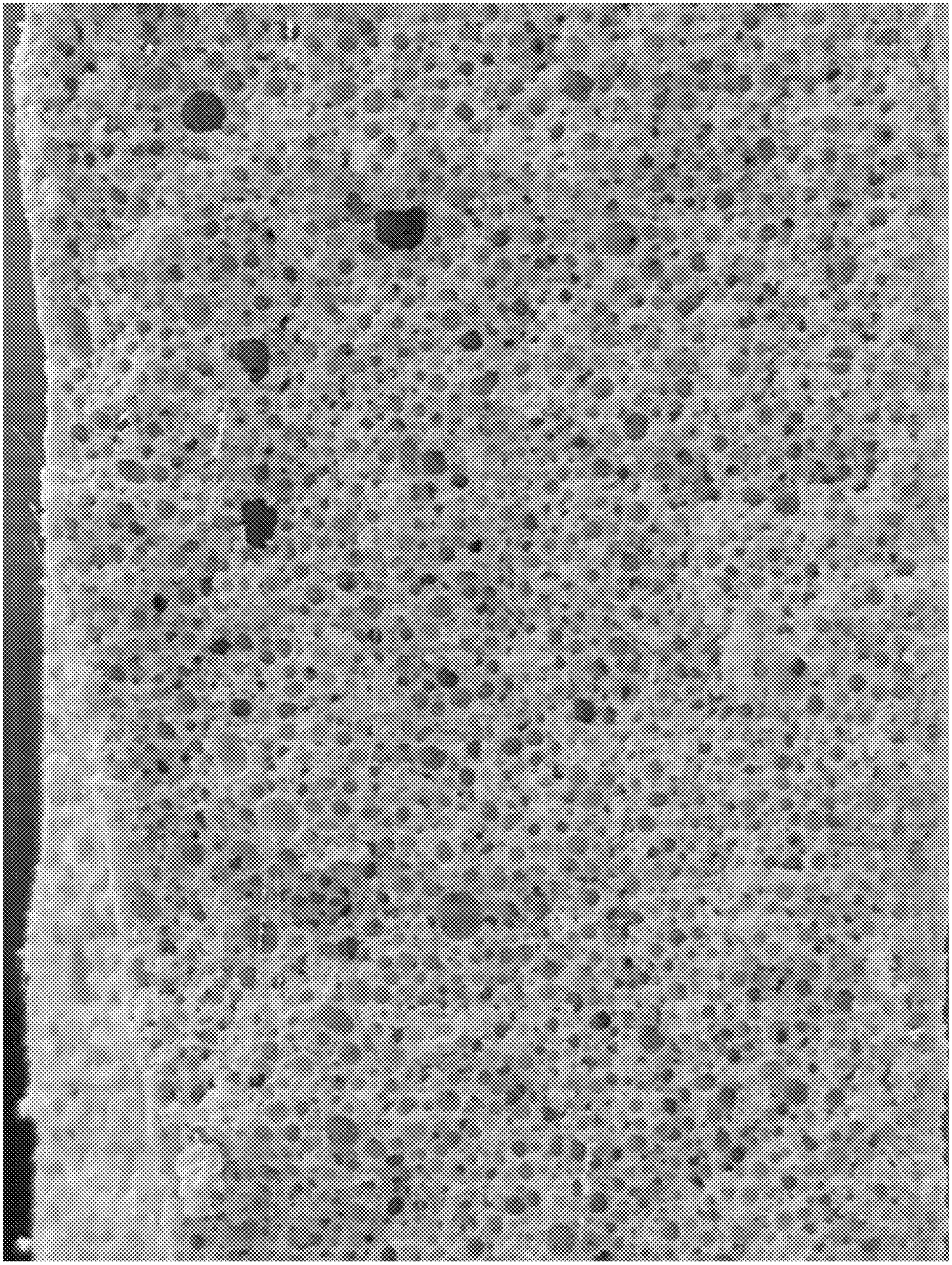
FIG. 12 PRIOR ART
FIG. 12 is a photograph representing a core of a gypsum board formed using a prior art system, magnified approximately 10×.
Figure 13:
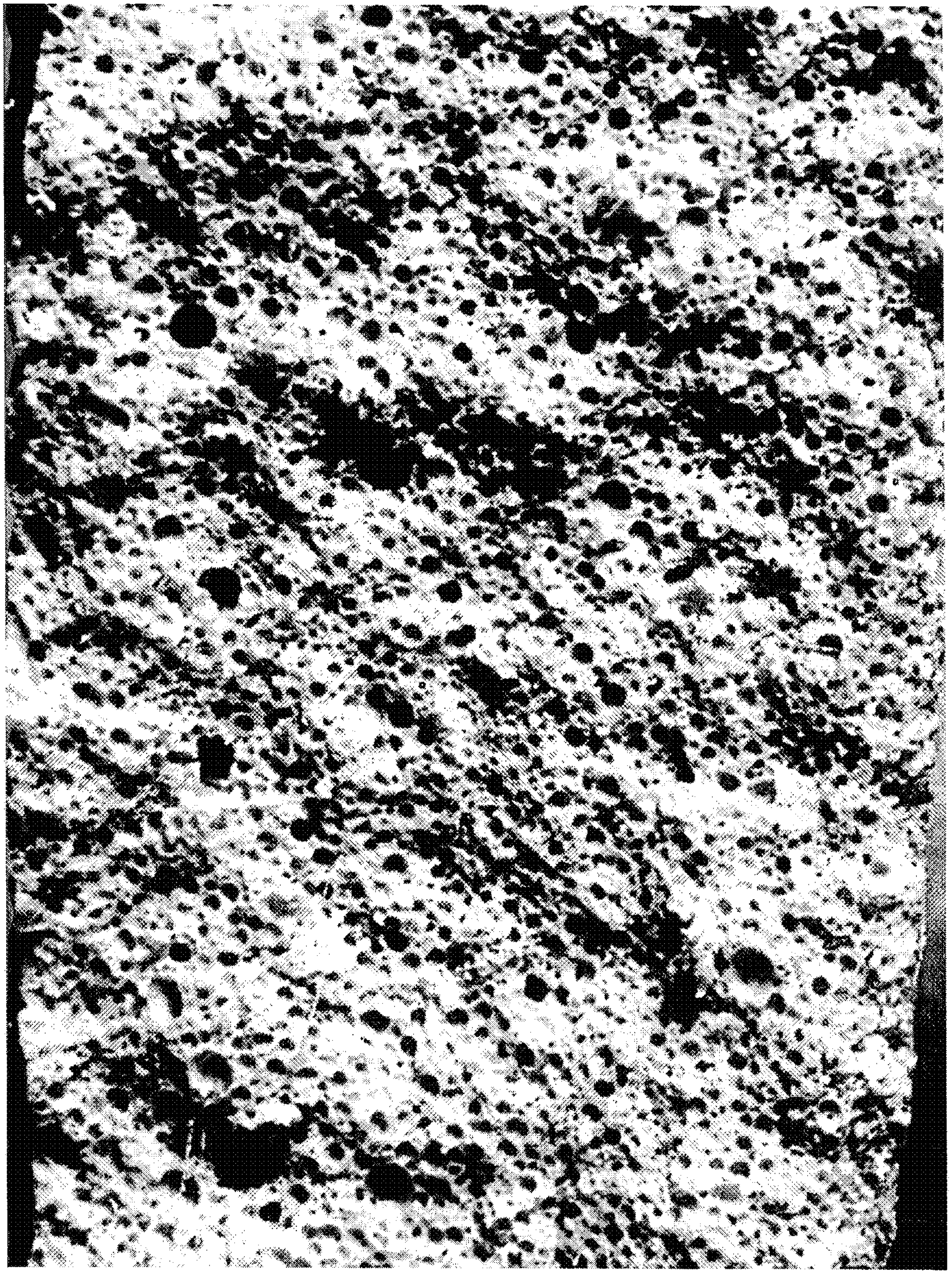
FIG. 13 is a photograph, magnified approximately 10×, representing a core of a gypsum board formed using the disclosed apparatus of FIGS. 2A and 2B.

To illustratively show the improvements in the finished gypsum board product, photographs were taken of a prior art product formed using a conventional system and a finished product formed during the example testing with the disclosed donut apparatus installed. FIG. 12 is a photograph, magnified approximately 10×, representing a core of a gypsum board formed using a prior art system. In such a prior art system, the average size of bubbles in a slurry mixture is smaller, resulting in more voids. FIG. 13 is a photograph, also magnified approximately 10×, representing a core of a gypsum board formed using a system with the baffled donut apparatus disclosed herein. The voids have diminished in this finished product. This is because the average bubble size in the slurry mixture is larger, due to the induced turbulence of the slurry mixture by the baffles. It is more desirable to have bigger foam bubbles throughout the slurry mixture so that there are bridges between the bubbles (coalescence) to result in a denser and stronger finished product.

Based on this test, then, it was noted that very little to substantially zero blisters or blows were found on the final gypsum board products after the baffled donut apparatus was installed and utilized in production. Also, with the installation and use of the baffled donut apparatus, little to substantially zero build up was observed in the mixer boot. Further, the finished gypsum board product had a more distinct, open core as well as diminished voids.

Accordingly, it may be understood by one of ordinary skill in the art that, based the description herein and the performed test, using a baffled donut apparatus such as apparatus 10 results in a more consistently mixed, homogenous slurry mixture (of foam and slurry). The turbulence and blending that is created by the baffles 22 in the apparatus 10 does not disrupt normal production of gypsum boards, or create new problems. Rather, it enhances the production process. The foam is blended in such a way that a cross-profile density of the finished gypsum board is more consistent. This allows for a finished board product that is more easily and consistently dried, which results in lower dryer temperatures and fuel savings. This also provides a finished product that has more desirable core attributes such as greater finished product strengths and a more consistent density and strength across its profile, resulting in a potentially lighter weight finished product. For example, there is less or substantially zero void formation and less blister formation in the finished gypsum board product.

In addition, more consistent blending of foam into the gypsum slurry, which results from utilizing the baffled donut apparatus 10, allows for fewer production related issues and improved production efficiencies. As previously noted above in the testing results, for example, the baffled donut apparatus 10 results in less slurry mixture build-up sticking to the inside of the mixer boot. Thus, less production stoppages resulting from lump formation are required, making the process more efficient. Additionally, with implementation of the disclosed baffled donut apparatus 10, there is less soap usage—and thus cost savings—from the ability to run lower density foam (30% improvement). That is, the herein disclosed baffled donut apparatus 10, and the turbulence it induces, results in better blending of foam and slurry, and allows use of more air to make foam without boot buildup, voids, and blisters. Using more air allows more foam volume with less soap needed to produce the foam, resulting in less costs. Thus, the disclosed apparatus 10 provides an overall ability to optimize the foam system and formulation to improve the characteristics of the finished product and reduce manufacturing costs. Finally, the controlled turbulence inside that is created by the baffled donut apparatus 10 creates a condition of "forced-coalescence" that allows for ideal conditions for the foam to blend with the gypsum slurry in such a way that highly desirable core bubbles are formed. This allows for further optimization of the foam and slurry formulations to further enhance the finished product and improve production efficiencies.

In addition, the design of the baffled donut apparatus 10 enables it to be manufactured for new production lines and systems, or retrofitted for an existing production line and system.

It should be understood, based on the disclosure above, that this disclosure further provides a method for mixing a slurry mixture for making gypsum board. The method as disclosed herein may utilize a system as shown in FIG. 10, for example, including the mixer, the foam injector, the canister, and the funnel body. The method may include, for example, mixing slurry at the first flow rate using the mixer 102; directing the mixed slurry to the exit gate; injecting foam using the foam injector 104 into the mixed slurry in the exit gate to form the slurry mixture; and inducing a swirl to the slurry mixture using the canister 106. The slurry mixture may continue to move at the first flow rate or optionally move at a second flow rate. The method further includes inducing turbulence into the slurry mixture to using the baffled donut apparatus 10, and depositing the slurry mixture via the outlet of the funnel body of the baffled donut apparatus onto paper to form the gypsum board. In an embodiment, the method further includes receiving the slurry mixture from the funnel body of the baffled donut apparatus 10 in the mixer boot 108 and depositing the slurry mixture from the mixer boot 108 onto paper (e.g., on a conveyor 110) to make gypsum board.

The method of manufacturing and materials used to form the disclosed apparatus 10 are not intended to be limited. In an embodiment, the funnel body 12 may be formed from stainless steel and chrome plated or coated on at least the inner wall 14 and lower side 34 therein. The baffles may also include chromed stainless steel. In another embodiment, one or more parts of the apparatus 10 may be formed from plastic. For example, the funnel body 12 may be formed from plastic, while the baffles are made of steel.

Although not described in great detail herein, it should be understood by one of ordinary skill in the art that the materials mixed and used in the system 100 and in which the baffled donut apparatus 10 induces flow are not intended to be limited. For example, the gypsum may be a calcined gypsum or hydrated calcium sulphate (e.g., semi-hydrate calcium sulphate, calcium sulfate hemihydrate or anhydrite, anhydrous calcium sulphate or anhydrite (type II or type III), or $CaSO4 \cdot 2(H20)$, $CaSO4 \cdot 0.5H20$, or $CaSO4$) and is not limited to such. Accordingly, a calcined gypsum slurry may be mixed and flow induced therein. Further, it should be understood that reference to the "slurry mixture" is not limited to just slurry and foam, and that such a "slurry mixture" may also include products or additives to the mixture such as accelerators, retarders, fillers, binders, etc.

Also, the parts of the system 100 as illustrated are not intended to be limiting. Alternate and/or additional parts may be provided as part of system 100 that utilizes the baffled donut apparatus 10 as disclosed herein.

Further, although described herein as being used with a gypsum slurry to produce a gypsum board (or plasterboard) with a gypsum core covered with sheet(s) of paper, it should be understood that the herein disclosed apparatus may be provided in alternate systems or assemblies and/or may be used with other aqueous slurries or solutions, for example, that are mixed or poured and dispensed or output using an outlet to form other products, and thus are not just limited to systems for mixing and depositing gypsum slurry to form gypsum boards.

While the principles of the disclosure have been made clear in the illustrative embodiments set forth above, it will be apparent to those skilled in the art that various modifications may be made to the structure, arrangement, proportion, elements, materials, and components used in the practice of the disclosure.

It will thus be seen that the features of this disclosure have been fully and effectively accomplished. It will be realized, however, that the foregoing preferred specific embodiments have been shown and described for the purpose of illustrating the functional and structural principles of this disclosure and are subject to change without departure from such principles. Therefore, this disclosure includes all modifications encompassed within the spirit and scope of the following claims.

What is claimed is:

1. An apparatus for inducing turbulence into a slurry mixture for making gypsum board comprising:

a funnel body extending in a longitudinal direction having a top portion, a bottom portion, an inner wall, an outer wall, an inlet opening at a top portion thereof for receiving the slurry mixture, and an outlet opening provided between the top portion and the bottom portion for outputting the slurry mixture, the inner wall comprising a first wall portion that slopes from the inlet opening towards the outlet opening and a second wall portion that extends from the outlet opening and towards the bottom portion; and at least one baffle projecting from the first wall portion of the inner wall towards a center of the funnel body, the at least one baffle comprising a first side, a second side and a length extending between the inlet opening and the outlet opening, the first side of the at least one baffle being provided adjacent the inlet opening and the second side of the at least one baffle being provided adjacent the outlet opening, wherein the at least one baffle is configured to induce turbulence into the slurry mixture poured into the inlet opening as the slurry mixture moves towards the outlet opening before exiting the outlet opening.

2. The apparatus according to claim 1, wherein the first wall portion of the inner wall is provided at an acute angle relative to a longitudinal axis extending through the center of the outlet opening.

3. The apparatus according to claim 1, wherein the inner wall has a slope of approximately 45 degrees relative to a longitudinal axis extending through a center of the outlet opening.

4. The apparatus according to claim 1, wherein the inner wall has an angle within a range between approximately 40 degrees and of approximately 60 degrees relative to a plane extending across the inlet opening of the funnel body.

5. The apparatus according to claim 1, wherein the second wall portion includes lower angled walls having an angle within a range between approximately 35 degrees and approximately 55 degrees relative to a plane extending across the bottom portion of the funnel body.

6. The apparatus according to claim 1, wherein the at least one baffle comprises a top extending towards the center of the funnel body, a bottom positioned against the inner wall, a leading edge and a trailing edge, wherein the leading edge of the at least one baffle extends from and is perpendicular to the inner wall and wherein the trailing edge comprises a curved surface or surface with a radius that extends from the leading edge towards the inner wall.

7. The apparatus according to claim 6, wherein the leading edge of the at least one baffle is positioned symmetrically relative to a longitudinal axis extending through a center of the outlet opening.

8. The apparatus according to claim 1, wherein the at least one baffle comprises a top extending towards the center of the funnel body and a bottom positioned against the inner wall, wherein the top of the at least one baffle has a slope that is the same as a slope of the inner wall.

9. The apparatus according to claim 1, wherein the at least one baffle comprises a top extending towards the center of the funnel body and a bottom positioned against the inner wall, wherein the top of the at least one baffle has a slope that is different than a slope of the inner wall.

10. The apparatus according to claim 1, wherein the at least one baffle has a tapered configuration that tapers along its length towards the outlet opening.

11. A system for introducing a slurry mixture for making gypsum board, the system comprising:

a mixer constructed and arranged to mix slurry to a first flow rate and direct the mixed slurry to an exit gate;

a foam injector constructed and arranged to inject foam into the mixed slurry in the exit gate to form a slurry mixture;

a canister constructed and arranged to induce a swirl to the slurry mixture; and a funnel body constructed and arranged to induce turbulence into the slurry mixture, the funnel body being connected to the canister, wherein the funnel body extends in a longitudinal direction and has a top portion, a bottom portion, an inner wall, an outer wall, an inlet opening at a top portion thereof for receiving the slurry mixture from the canister, an outlet opening provided between the top portion and the bottom portion for outputting the slurry mixture, the inner wall comprising a first wall portion that slopes from the inlet opening towards the outlet opening and a second wall portion that extends from the outlet opening and towards the bottom portion, and at least one baffle projecting from the first wall portion of the inner wall towards a center of the funnel body, the at least one baffle comprising a first side, a second side and a length extending between the inlet opening and the outlet opening, the first side of the at least one baffle being provided adjacent the inlet opening and the second side of the at least one baffle being provided adjacent the outlet opening, and wherein the at least one baffle is configured to induce turbulence into the slurry mixture poured into the inlet opening from the canister as the slurry mixture moves towards the outlet opening before exiting the outlet opening for depositing onto a moving conveyor to form the gypsum board.

12. The system according to claim 11, wherein the canister is constructed and arranged to reduce the first flow rate of the slurry mixture such that the slurry mixture flows at a second flow rate therefrom, the second flow rate being lower than the first flow rate.

13. The system according to claim 11, further comprising a mixer boot constructed and arranged to receive the slurry mixture from the funnel body and to deposit the slurry mixture onto the moving conveyor to make gypsum board.

14. The system according to claim 11, wherein the inner wall is provided at an acute angle relative to a longitudinal axis extending through a center of the outlet opening.

15. The system according to claim 11, wherein the inner wall has a slope of approximately 45 degrees relative to a plane extending across the inlet opening of the funnel body.

16. The system according to claim 11, wherein the inner wall has an angle within a range between approximately 40 degrees and of approximately 60 degrees relative to a plane extending across the inlet opening of the funnel body.

17. The system according to claim 11, wherein the second wall portion includes lower angled walls having an angle within a range between approximately 35 degrees and approximately 55 degrees relative to a plane extending across a bottom of the funnel body.

18. The system according to claim 11, wherein the at least one baffle comprises a top, a bottom, a leading edge and a trailing edge, wherein the leading edge of the at least one baffle extends from and is perpendicular to the inner wall and wherein the trailing edge comprises a curved surface or a surface with a radius that extends from the leading edge towards the inner wall.

19. The system according to claim 18, wherein the leading edge of each baffle is positioned symmetrically relative to a longitudinal axis extending through a center of the outlet opening.

20. The system according to claim 11, wherein the at least one baffle comprises a top extending towards the center of the funnel body and a bottom positioned against the inner wall, wherein the top of the at least one baffle has a slope that is the same as a slope of the inner wall.

21. The system according to claim 11, wherein the at least one baffle comprises a top extending towards the center of the funnel body and a bottom positioned against the inner wall, wherein the top of the at least one baffle has a slope that is different than a slope of the inner wall.

22. The system according to claim 11, wherein the at least one baffle has a tapered configuration that tapers along its length towards the outlet opening.

23. A method for mixing a slurry mixture for making gypsum board, comprising:

mixing a slurry at a first flow rate;

directing the mixed slurry to an exit gate;

injecting foam into the mixed slurry in the exit gate to form a slurry mixture;

inducing a swirl to the slurry mixture;

induce turbulence into the slurry mixture; and depositing the slurry mixture via an outlet of a funnel body onto a moving conveyor to form the gypsum board, wherein the method is implemented with a system including a mixer constructed and arranged to mix the slurry to the first flow rate and direct the mixed slurry to the exit gate, a foam injector constructed and arranged to inject the foam into the mixed slurry in the exit gate to form the slurry mixture, a canister constructed and arranged to induce the swirl to the slurry mixture; and a funnel body constructed and arranged to further induce the turbulence into the slurry mixture, the funnel body extending in a longitudinal direction and having a top portion, a bottom portion, an inner wall, an outer wall, an inlet opening for receiving the slurry mixture from the canister, an outlet opening provided between the top portion and the bottom portion, the inner wall comprising a first wall portion that slopes from the inlet opening towards the outlet opening and a second wall portion that extends from the outlet opening and towards the bottom portion, and at least one baffle projecting from the first wall portion of the inner wall towards a center of the funnel body, the at least one baffle configured to induce turbulence into the slurry mixture poured into the inlet opening from the canister as the slurry mixture moves towards the outlet, the at least one baffle comprising a first side, a second side and a length extending between the inlet opening and the outlet opening, the first side of the at least one baffle being provided adjacent the inlet opening and the second side of the at least one baffle being provided adjacent the outlet opening.

24. The method according to claim 23, wherein the system further comprises a mixer boot constructed and arranged to receive the slurry mixture from the funnel body and to deposit the slurry mixture, and wherein the method further comprises:

receiving the slurry mixture from the funnel body in the mixer boot; and depositing the slurry mixture from the mixer boot onto the moving conveyor to make gypsum board.

* * * * *